(12) United States Patent
Clements

(10) Patent No.: US 9,939,088 B2
(45) Date of Patent: Apr. 10, 2018

(54) FLEXIBLE PIPE BODY LAYER AND METHOD OF PRODUCING SAME

(71) Applicant: GE Oil & Gas UK Limited, Nailsea, Bristol (GB)

(72) Inventor: Richard Alasdair Clements, Durham (GB)

(73) Assignee: GE Oil & Gas UK Limited, Nailsea, Bristol (GB)

(*) Notice: Subject to any disclaimer, the term of this patent is extended or adjusted under 35 U.S.C. 154(b) by 173 days.

(21) Appl. No.: 14/895,317

(22) PCT Filed: May 7, 2014

(86) PCT No.: PCT/GB2014/051395
§ 371 (c)(1),
(2) Date: Dec. 2, 2015

(87) PCT Pub. No.: WO2014/195671
PCT Pub. Date: Dec. 11, 2014

(65) Prior Publication Data
US 2016/0123503 A1 May 5, 2016

(30) Foreign Application Priority Data
Jun. 3, 2013 (GB) .................................. 1309887.6

(51) Int. Cl.
*F16L 11/16* (2006.01)
*F16L 11/08* (2006.01)
(Continued)

(52) U.S. Cl.
CPC ................ *F16L 11/08* (2013.01); *B32B 1/08* (2013.01); *B32B 9/02* (2013.01); *B32B 9/045* (2013.01);
(Continued)

(58) Field of Classification Search
CPC ........... F16L 11/12; F16L 11/16; F16L 53/002
(Continued)

(56) References Cited

U.S. PATENT DOCUMENTS 6,145,546 A 11/2000 Hardy
6,237,688 B1 * 5/2001 Burleson ................ E21B 29/02
166/281

(Continued)

FOREIGN PATENT DOCUMENTS

| JP | 2002011544 A | 1/2002 | |
| WO | WO 9524578 A1 * | 9/1995 | .............. F16L 9/147 |
| WO | WO1997/025564 A1 | 7/1997 | |
| WO | WO2012/097823 A1 | 7/2012 | |
| WO | WO2013/030532 A1 | 3/2013 | |

OTHER PUBLICATIONS

International Search Report and Written Opinion of the International Searching Authority, dated Jun. 25, 2014, for corresponding International Application No. PCT/GB2014/051395, 14 pages.
(Continued)

*Primary Examiner* — Patrick F Brinson
(74) *Attorney, Agent, or Firm* — Klarquist Sparkman, LLP

(57) ABSTRACT

A flexible pipe body configured for offshore use or a flexible pipe precursor, and a method of preparing a flexible pipe are disclosed. The pipe body or precursor includes a sacrificial layer which is, at least partially, removable on contact with a solvent medium such as an aqueous solvent, in particular water.

38 Claims, 3 Drawing Sheets

(51) Int. Cl.

| | |
|---|---|
| *B32B 15/08* | (2006.01) |
| *B32B 1/08* | (2006.01) |
| *F16L 11/12* | (2006.01) |
| *B32B 9/02* | (2006.01) |
| *B32B 9/04* | (2006.01) |
| *B32B 15/02* | (2006.01) |
| *B32B 23/08* | (2006.01) |
| *B32B 27/08* | (2006.01) |
| *B32B 27/28* | (2006.01) |
| *B32B 27/30* | (2006.01) |
| *B32B 27/32* | (2006.01) |
| *B32B 27/34* | (2006.01) |
| *B32B 27/36* | (2006.01) |

(52) U.S. Cl.
CPC .............. *B32B 15/02* (2013.01); *B32B 15/08* (2013.01); *B32B 23/08* (2013.01); *B32B 27/08* (2013.01); *B32B 27/286* (2013.01); *B32B 27/30* (2013.01); *B32B 27/322* (2013.01); *B32B 27/34* (2013.01); *B32B 27/36* (2013.01); *F16L 11/083* (2013.01); *F16L 11/12* (2013.01); *B32B 2307/554* (2013.01); *B32B 2307/714* (2013.01); *B32B 2597/00* (2013.01)

(58) Field of Classification Search
USPC .............. 138/134, 135, 140, 137, 131, 129; 166/55, 297
See application file for complete search history.

(56) References Cited

U.S. PATENT DOCUMENTS

| | | | | |
|---|---|---|---|---|
| 6,397,950 | B1* | 6/2002 | Streich | E21B 17/00 166/177.2 |
| 6,431,276 | B1* | 8/2002 | Robb | E21B 23/00 166/135 |
| 8,061,388 | B1* | 11/2011 | O'Brien | F16L 55/1011 138/89 |
| 2004/0060610 | A1* | 4/2004 | Espinasse | F16L 11/16 138/134 |
| 2005/0092363 | A1* | 5/2005 | Richard | E21B 37/06 137/73 |
| 2005/0163994 | A1* | 7/2005 | Rouppert | B05D 5/00 428/339 |
| 2005/0172889 | A1* | 8/2005 | Bellmann | D21H 25/10 118/123 |
| 2006/0129179 | A1 | 6/2006 | Weber et al. | |
| 2010/0032151 | A1* | 2/2010 | Duphorne | E21B 23/02 166/55 |
| 2013/0276931 | A1* | 10/2013 | Fernando | B29C 71/0009 138/137 |

OTHER PUBLICATIONS

International Preliminary Report on Patentability from the International Bureau, dated Dec. 8, 2015, for corresponding International Patent Application No. PCT/GB2014/051395, 7 pages.

* cited by examiner

FLEXIBLE PIPE BODY LAYER AND METHOD OF PRODUCING SAME

CROSS REFERENCE TO RELATED APPLICATIONS

This is the U.S. National Stage of International Application No. PCT/GB2014/051395, filed May 7, 2014, which in turn claims the benefit of and priority to United Kingdom Patent Application No. GB1309887.6, filed Jun. 3, 2013.

The present invention relates to a flexible pipe body or a flexible pipe body precursor and method of producing the same. In particular, but not exclusively, the present invention relates to the use of one or more materials which are at least partially soluble or at least partially dispersible in a solvent medium, in particular an aqueous medium, as one or more component layers of the flexible pipe body or the flexible pipe body precursor. The at least partially soluble or dispersible material forms, in embodiments, one or more sacrificial layers of the pipe body or pipe body precursor, the sacrificial layer or layers being removed (or removable) wholly or in part through contact with the solvent medium prior to, or during, use of the flexible pipe body. In embodiments, the said component layer or layers may comprise one or more wear layers.

BACKGROUND

Traditionally flexible pipe is utilised to transport production fluids, such as oil and/or gas and/or water and aqueous media (when associated with oil or gas production), from one location to another. Flexible pipe is particularly useful in connecting a sub-sea location (which may be deep underwater, say 1000 meters or more) to a sea level location. The pipe may have an internal diameter of typically up to about 0.6 meters. Flexible pipe is generally formed as an assembly of a flexible pipe body and one or more end fittings. The pipe body is typically formed as a combination of layered materials that form a pressure-containing conduit. The pipe structure allows large deflections without causing bending stresses which would impair the pipe's functionality over its lifetime. The pipe body is generally built up as a combined structure including metallic and polymer layers.

Unbonded flexible pipe has been used for deep water (less than 3,300 feet (about 1,000 meters)) and ultra deep water (greater than 3,300 feet) developments. The increasing demand for oil is causing exploration to occur at greater and greater depths where environmental factors are more extreme. For example in such deep and ultra-deep water environments the cold ocean floor temperature increases the risk of production fluids cooling to a temperature that may lead to pipe blockage. Increased depths also increase the pressure associated with the environment in which the flexible pipe must operate. As a result the need for high levels of performance from the layers of the flexible pipe body is increased.

Flexible pipe may also be used for shallow water applications (for example less than around 500 meters depth) or even for shore (overland) applications. The skilled person appreciates that different constructional considerations apply for flexible pipe intended for these different environments.

Flexible pipes typically comprise an inner fluid retaining layer (also known as the internal pressure sheath) which defines a bore within which fluid transmitted through the pipe is contained. Some types of flexible pipe, known as "rough bore" pipe, include a carcass layer internally of the inner fluid retaining layer. Flexible pipe without a carcass layer is generally referred to as "smooth bore" pipe.

The carcass layer may usefully be of an interlocked construction that can be used as the innermost layer to prevent, totally or partially, collapse of the internal pressure sheath due to external pressure, tensile armour pressure and/or mechanical crushing loads, or in the event of pipe decompression. In known examples of flexible pipe, the carcass layer may comprise helically wound and interlocked steel strip material.

In rough bore pipes the first layer over the carcass layer (which may be the inner fluid retaining layer) is usually a polymer layer, typically an extruded polymer layer. This polymer layer tends, at least partially, to conform to the outer shape of the carcass layer. Such conformation introduces irregularities into the inner surface profile of the polymer layer as it follows the external form of the carcass layer. The irregularities may be in the form of local projections and valleys such as nubs or cusps. These irregularities are undesirable as they can act as areas of stress concentration. This is particularly undesirable in the case of the inner fluid retaining layer, since this layer is a critical pressure containing layer of the flexible pipe body.

In smooth bore and rough bore flexible pipes one or more polymer layers may lie adjacent a reinforcement layer, such as an armour layer. One example of such a layer is a polymer barrier layer internally adjacent a metallic pressure armour layer. Such polymer layers may be subjected to quite severe non-uniform, highly localised strain deriving from the non-uniformity of the inner surface profile of the overlying armour layer. This is because the armour layer is usually formed from interlocking wires, and there are gaps, troughs, valleys or the like between adjacent windings. The underlying polymer layer may thus tend to deform and creep into the gaps when under pressure.

In flexible pipes polymer layers are typically formed by extrusion.

Most polymers will have a certain maximum allowable strain above which the risk of damage to the material is much greater. It is therefore desirable to avoid use conditions where such maximum allowable strain is exceeded, or to construct the flexible pipe body in such a way that the maximum allowable strain is not approached, even in arduous use conditions.

By way of example, one situation in which the maximum allowable strain of a polymer layer could potentially be approached is in a factory acceptance test procedure. In accordance with industry regulations, all flexible pipe structures must undergo a factory acceptance test (FAT) prior to sale. This involves pressurising a pipe bore with a fluid such as water at 1.5 times the usual pressure of use. The fluid is thus a pressurising medium.

The application of internal pressure (i.e. pressure from within the bore) to the pipe may produce radial expansion in all layers and a polymer layer may (as indicated above) thus undergo deformation and may tend to creep into the gaps of an overlying armour layer. At high pressures (about 8000 psi/55 MPa or more), the resultant strain distribution within the polymer layer can be highly localised at the areas around the gaps, and the polymer material may deform by cavitation rather than plastic flow. This can in turn result in the formation of microcrazing or microcracking on the radially inner surface of the polymer layer. During any subsequent loading (such as the loading experienced during normal use in transporting production fluids) this microcrazing may then extend to form longer and/or deeper cracks throughout the polymer layer. This can increase the risk of failure of the polymer layer and may ultimately lead to loss of pressure containment, having an adverse effect on the lifetime of a flexible pipe.

It is known for flexible pipe body to be provided with one or more wear layers. The provision of such wear layers may be desirable and useful, for example to prevent or mitigate wear of a barrier layer caused through relative movement of the barrier layer and the carcass layer. A wear layer may be further advantageous in providing a smoother and more uniform surface onto which a barrier layer can successfully be extruded, in contrast to the outer surface of the carcass layer which, because of the construction of the carcass layer, is often not smooth and may contain recurring ridges and depressions and the like. A wear layer provided between a barrier layer and an outer (with respect to the barrier layer) pressure armour layer can be advantageous in accommodating some degree of creep between the barrier layer and the pressure armour layer, which can be useful in avoiding crazing of the barrier layer.

However, the provision of one or more wear layers can have attendant disadvantages. For example, it is advantageous in general to seek to reduce the number of layers of a flexible pipe body in order to improve manufacturing efficiencies and to reduce weight and material cost (while maintaining effectiveness of the pipe body in use throughout the service life of the pipe—typically 25 years). It is further known that occasionally in service the carcass layer and barrier layer of the flexible pipe body may internally collapse due to a pressure build up between the wear layer and the barrier layer, especially when the bore pressure (of the fluid being conveyed in the flexible pipe) is released. This is an issue uniquely associated with flexible pipe body structures incorporating multi-layer extrusions.

BRIEF SUMMARY OF THE DISCLOSURE

According to a first aspect of the present invention there is provided a flexible pipe body, or a precursor for a flexible pipe body, comprising an inner fluid retaining layer defining a pipe bore for the transmission of fluids, at least one reinforcement layer configured to resist internal or external pressure and/or tensile loads in the pipe body or precursor, and at least one sacrificial layer, wherein the sacrificial layer is soluble or dispersible on contact with a solvent medium.

The sacrificial layer may be removed wholly or in part from the flexible pipe body or precursor by contact with the solvent medium. Partial removal of the sacrificial layer may constitute removal only of a local region or area of the sacrificial layer.

In preferred embodiments the flexible pipe body or precursor is configured for offshore use.

Examples of reinforcement layers include, without limitation, a carcass layer, a pressure armour layer, and a tensile armour layer.

In some preferred embodiments said inner fluid retaining layer is a barrier layer, wherein said at least one reinforcement layer includes a carcass layer arranged within the barrier layer, and wherein an inner sacrificial layer is arranged between the carcass layer and the barrier layer.

Said inner sacrificial layer may in embodiments be a coating on the carcass layer.

Said inner sacrificial layer may in embodiments be an extruded layer.

Said inner sacrificial layer may in embodiments be co-extruded with the barrier layer.

Said inner sacrificial layer may in embodiments comprise a tape wound around the carcass layer.

In some preferred embodiments the flexible pipe body or a precursor comprises an outer sheath layer and defines an annulus region between said outer sheath layer and the inner fluid retaining layer, the annulus region including at least one outer sacrificial layer and at least one reinforcement layer.

In some embodiments the at least one reinforcement layer comprises or includes a pressure armour layer. In some embodiments a said outer sacrificial layer is provided in contact with said pressure armour layer.

In some embodiments the at least one reinforcement layer comprises or includes at least one tensile armour layer. In some embodiments a said outer sacrificial layer is provided in contact with a said tensile armour layer.

In some embodiments said outer sacrificial layer is a coating on the inner fluid retaining layer.

In some embodiments said outer sacrificial layer is an extruded layer.

In some embodiments said outer sacrificial layer is co-extruded with the inner fluid retaining layer.

In some embodiments said outer sacrificial layer comprises a tape wound respectively around one or more of:
the inner fluid retaining layer
a pressure armour layer,
a tension armour layer, or
another layer the flexible pipe body or precursor disposed outwardly of the inner fluid retaining layer and inwardly of the outer sheath.

In preferred embodiments said sacrificial layer is soluble or dispersible in an aqueous solvent medium. Preferably said sacrificial layer is soluble or dispersible in water.

In some embodiments the or each sacrificial layer comprises or consists of a material independently selected from
one or more soluble or dispersible synthetic polymeric materials, and/or
one or more soluble or dispersible natural, or natural-derived, oligomeric or polymeric materials,
or mixtures or combinations thereof.

Preferably said material is aqueously soluble or dispersible.

In some embodiments the natural or natural-derived polymer is selected from one or more soluble or dispersible polysaccharides, gelatin based materials, and casein derivatives.

In some embodiments the one or more soluble or dispersible polysaccharides is selected from carrageenan, guar gum, xanthan gum, pectins, dextran, starches, alginates, glucose based materials, sucrose based materials or derivatives thereof.

In some embodiments the one or more soluble or dispersible polysaccharides is selected from one or more cellulose ethers such as hydroxypropylmethyl cellulose, hydroxypropyl cellulose, hydroxyethyl cellulose and carboxymethyl cellulose.

In some embodiments the one or more soluble or dispersible synthetic polymeric materials is selected from polyvinylacetate (PVA), polyethylene glycols, polyvinylpyrrolidones, polyamines, polyethyleneamines, polyacrylic acids, polyvinyl alcohols, polyacrylamides, polyphosphoesters and polyphosphazenes or combinations thereof. Polyvinylacetate (PVA) is particularly preferred.

In some embodiments including an outer sacrificial layer, the outer sacrificial layer may preferably comprise or include a functional material which is released or activated on contact of the outer sacrificial layer with said solvent medium.

In some embodiments the functional material is a dye which is soluble or dispersible in the solvent medium.

In some embodiments the functional material is a sealant which acts to seal a breach in the outer sheath layer on penetration of solvent medium through the outer sheath layer.

In some embodiments the functional material is a sealant which acts to seal a breach in the inner sheath layer on penetration of solvent medium through the inner sheath layer.

In some embodiments the functional material acts on contact with solvent medium to neutralise or render harmless potentially harmful or damaging materials contained in, or which are components of, the solvent medium.

In some embodiments the functional material acts to neutralise or render harmless potentially harmful or damaging materials which permeate into the annulus region.

According to a second aspect of the invention there is provided a method of preparing flexible pipe body, or a precursor for a flexible pipe body, the method comprising:

providing at least one reinforcement layer, configured to resist internal or external pressure and/or tensile loads in the pipe body or precursor layer, providing an inner fluid retaining layer configured to define a pipe bore for the transmission of fluids, providing at least one sacrificial layer, wherein the sacrificial layer is soluble or dispersible on contact with a solvent medium, and dissolving or dispersing at least part of the sacrificial layer in a solvent medium.

In some embodiments the soluble or dispersible material is an aqueously soluble or aqueously dispersible material.

In some embodiments the solvent medium is an aqueous solvent, and in some preferred embodiments the solvent medium is water.

In some embodiments the soluble or dispersible material comprises a material or combination of materials as defined hereinabove in respect of the first aspect of the invention.

In some embodiments said inner fluid retaining layer is a barrier layer, the method comprising providing a reinforcement layer comprising a carcass layer arranged within the barrier layer, providing an inner sacrificial layer arranged between the carcass layer and the barrier layer and removing at least part, and preferably substantially all, of the inner sacrificial layer by contact with the solvent medium.

In some embodiments the step of removing the inner sacrificial layer comprises contacting the inner sacrificial layer with an aqueous medium, preferably water, during a Factory Acceptance Testing (FAT) procedure.

In some embodiments the method further comprises:

providing an outer sheath layer thereby to define an annulus region between said outer sheath layer and the inner fluid retaining layer, providing at least one outer sacrificial layer arranged in said annulus region, and removing at least part, and preferably substantially all, of the outer sacrificial layer by contact with the solvent medium when said solvent medium is present in the annulus region.

In some embodiments the step of removing said outer sacrificial layer comprises deliberately or intentionally introducing said solvent medium to the annulus region.

In some embodiments the solvent medium is present in the annulus region as a result of penetration or transmission of the solvent medium through the outer sheath layer or the inner fluid retaining layer.

The present invention seeks to provide an improved flexible pipe body and a method for the manufacture of improved flexible pipe body.

The present invention seeks to overcome, alleviate or mitigate disadvantages associated with conventional wear layers.

The present invention seeks to retain, at least to some extent, advantages associated with conventional wear layers, notably the provision of a smooth wear layer on the carcass layer onto which a barrier layer may successfully be extruded.

Embodiments of the invention may provide the advantage that a flexible pipe body is provided that has at least one removable polymer layer. Such a polymer layer can be present initially to fulfill a desired function and may subsequently be removed from the flexible pipe body when the presence of the polymer layer is no longer considered to be desirable or advantageous, such as when, or after, the polymer layer has fulfilled its intended purpose. Such a polymer layer can conveniently be termed a "sacrificial" layer. In embodiments, the removable polymer layer (sacrificial layer) may be a removable (sacrificial) wear layer.

In some embodiments the sacrificial layer remains a constituent part of a flexible pipe body during (and in some cases throughout) the period of use of the flexible pipe body in service.

In other embodiments, the sacrificial layer is removed prior to entry of the flexible pipe body into service. Such a removal step of the sacrificial layer may occur during a manufacturing process prior to completion of the flexible pipe body, or after completion of the manufacturing process, but prior to entry of the flexible pipe body into service. In these latter embodiments, the flexible pipe body including the sacrificial layer is termed a "precursor" or a "precursor for a flexible pipe body" or a "flexible pipe body precursor". Thus, the precursor becomes a flexible pipe body on removal of the sacrificial layer (subject, in the case of removal during manufacture, to the completion of subsequent manufacturing steps).

Embodiments of the invention may provide the advantage that a flexible pipe body has at least one wear layer which can be removed from the flexible pipe body by contacting the wear layer with water or a suitable aqueous solution.

Embodiments of the invention may provide the advantage that a flexible pipe body has at least one wear layer which is soluble or dispersible in aqueous solution, notably in water.

Embodiments of the invention may provide the advantage that a flexible pipe body has at least one wear layer which is removable from the flexible pipe body during a factory acceptance testing (FAT) procedure. Embodiments of the invention may provide the further advantage that the wear layer is removable by contact with water during a pressure testing procedure forming part of the factory acceptance testing procedure.

BRIEF DESCRIPTION OF THE DRAWINGS

Embodiments of the invention are further described hereinafter, by way of example only, and without limitation, with reference to the accompanying drawings, in which.

DETAILED DESCRIPTION

Figure 1:
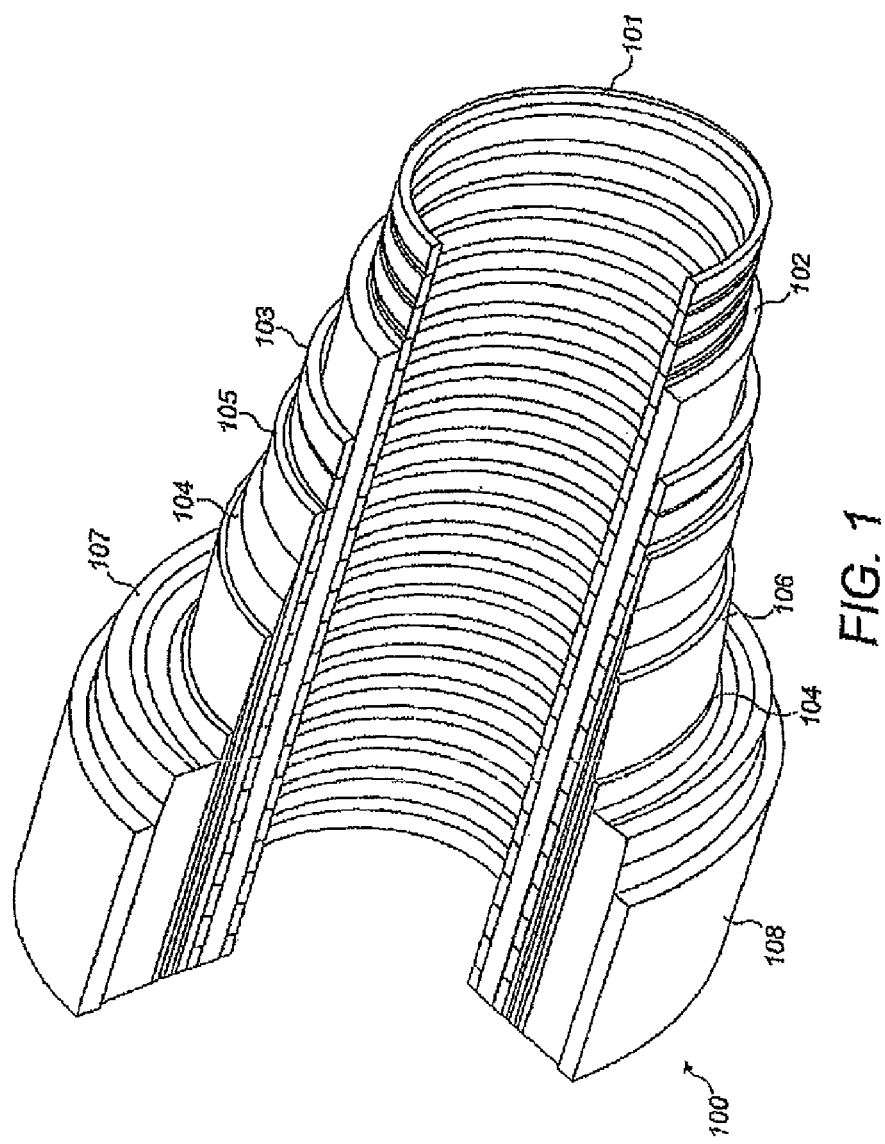
FIG. 1 illustrates a typical flexible pipe body.

In the drawings like reference numerals refer to like parts.

Throughout this specification, reference is made to a flexible pipe. It will be understood that a flexible pipe is an assembly of a portion of a pipe body and one or more end fittings in each of which a respective end of the pipe body is terminated. FIG. 1 illustrates how, in a typical arrangement, pipe body 100 may be formed from a combination of layered materials that form a pressure-containing conduit. In various embodiments, the pipe body of the present invention may usefully be of the general type illustrated in FIG. 1, it being noted nevertheless that although a number of particular layers are illustrated in FIG. 1, embodiments of the present invention are not confined to the illustrated arrangement. Rather, embodiments of the invention are broadly applicable to coaxial pipe body structures including two or more layers manufactured from a variety of possible materials. It is to be further noted that the layer thicknesses are shown for illustrative purposes only.

As illustrated in FIG. 1, a flexible pipe body may include an innermost carcass layer 101. An internal pressure sheath 102 may also be provided. The carcass may usefully be of an interlocked construction that can be used as the innermost layer to prevent, totally or partially, collapse of the internal pressure sheath 102 due to pipe decompression, external pressure, tensile armour pressure or mechanical crushing loads.

It will be appreciated that certain embodiments of the present invention may be applicable to 'smooth bore' operations (i.e. without a carcass) as well as such 'rough bore' applications (with a carcass).

The internal pressure sheath 102 acts as a fluid retaining layer and in embodiments of the invention may comprise a polymer layer that ensures internal fluid integrity. It is to be understood that this layer may itself comprise a number of unbonded sub-layers. It will be appreciated that when, in a flexible pipe body, a carcass layer is utilised, the internal pressure sheath is often referred to by those skilled in the art as a barrier layer. Accordingly, the term "barrier layer" when used in this specification refers to an internal pressure sheath layer acting as an inner fluid retaining layer in conjunction with a carcass layer. In other forms of flexible pipe body where the carcass layer may be absent (so-called smooth bore operation) the internal pressure sheath may be referred to as a liner. A pressure armour layer 103 may be provided in the pipe body. The pressure armour layer 103 is a structural layer that increases the resistance of the flexible pipe to internal and external pressure and mechanical crushing loads. The layer may also structurally support the internal pressure sheath 102, and typically consists of an interlocked construction of wires with a lay angle close to 90°.

The flexible pipe body 100 also may include a first tensile armour layer 105 and may further include a second tensile armour layer 106. Each tensile armour layer is intended to sustain tensile loads and internal pressure. The tensile armour layer is often formed from a plurality of metallic wires (to impart strength to the layer) that may be located over an inner layer and may be helically wound along the length of the pipe at a lay angle typically between about 10° to 55°. The tensile armour layers 105, 106 are often counter-wound in pairs.

A flexible pipe body as shown may also include layers of tape 104 which can help to contain underlying layers and may to some extent prevent abrasion between adjacent layers.

A flexible pipe body may usefully include one or more layers of insulation 107 and may include an outer sheath 108. Outer sheath 108 may comprise a polymer layer used to protect the pipe against penetration of seawater and other external environments, corrosion, abrasion and mechanical damage.

The void space formed between the inner barrier layer 102 and the outer sheath 108, containing the armouring and other layers 103-107 is known as the annulus of the pipe.

Although not specifically shown in FIG. 1, it is known to include a so-called wear layer between the carcass layer and internal pressure sheath 102. The wear layer may be a polymer layer intended to help prevent wear between the carcass layer (which may have a non-smooth surface) and the barrier layer, noting that the carcass layer 101 and the barrier layer 102 may experience relative movement during the lifetime of the flexible pipe body, for example during pipe laying operations.

In a typical and commonly used arrangement, each flexible pipe comprises at least one portion, referred to herein as pipe body 100 (or a segment or section thereof) together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
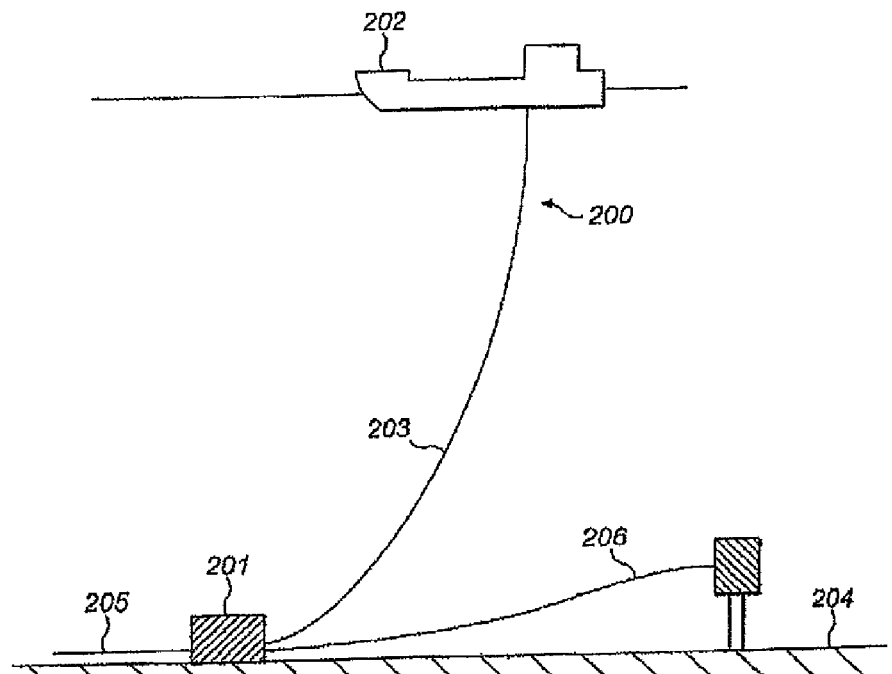
FIG. 2 illustrates a typical riser assembly.

FIG. 2 illustrates a riser assembly 200 suitable for transporting production fluid such as oil and/or gas and/or water from a sub-sea location 201 to a floating facility 202. For example, in FIG. 2 the sub-sea location 201 includes a sub-sea flow line. The flexible flow line 205 comprises a flexible pipe, wholly or in part resting on the sea floor 204 or buried below the sea floor and used in a static application. The floating facility may be provided by a platform and/or buoy or, as illustrated in FIG. 2, a ship. The riser assembly 200 is provided as a flexible riser, that is to say a flexible pipe 203 connecting the ship to the sea floor installation. The flexible pipe may be in segments of flexible pipe body with connecting end fittings.

It will be appreciated that there are different types of riser, as is well-known by those skilled in the art. Embodiments of the present invention may be used with any type of riser, such as a freely suspended (free, catenary riser), a riser restrained to some extent (buoys, chains), totally restrained riser or enclosed in a tube (I or J tubes).

FIG. 2 also illustrates how portions of flexible pipe can be utilised as a flow line 205 or jumper 206.

Figure 3:
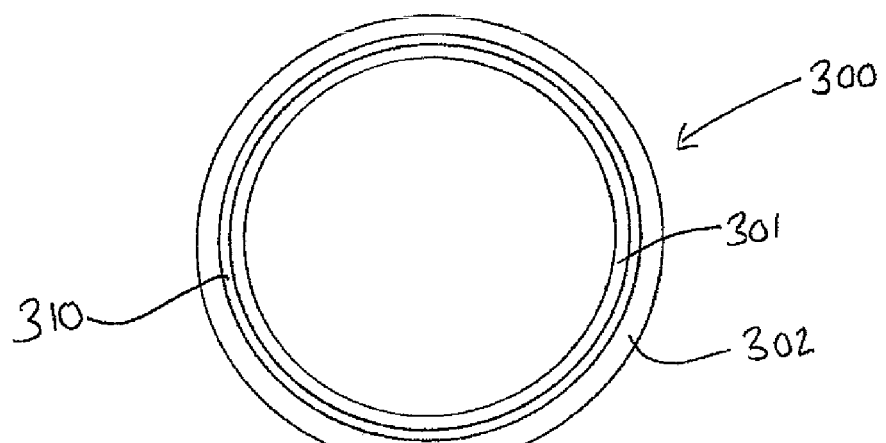
FIG. 3 illustrates a cross section though a flexible pipe body according to one embodiment of the invention.

Referring now in particular to FIG. 3, layers and components of the illustrated flexible pipe body having the same or equivalent construction to those of FIG. 1 are given the same reference number, except for the substitution of the prefix "1" with the prefix "3". By way of example, carcass layer 101 of FIG. 1 is equivalent to carcass layer 301 in FIG. 3. For clarity of illustration, not all the layers shown in FIG. 1 are illustrated in FIG. 3, it being understood that some or all of the non-illustrated layers of FIG. 1 may be present in the embodiment illustrated in FIG. 3, as may other layers not shown in FIG. 1. The presence or absence of particular layers not specifically illustrated in FIG. 3 may be determined by the person skilled in the art and in accordance with the particular intended use requirements of a given flexible pipe body 300 of the invention.

The barrier layer 302 and the carcass layer 301 may be constructed as is generally known in the art. Thus, the carcass layer may typically consist of a plurality of interlocking metallic elements, or a single longitudinally extensive element arranged in a helical configuration with interlocking of adjacent windings. The barrier layer 302 may typically comprise a polymeric extrusion surrounding the carcass layer 301 and which is generally cylindrical in form. The barrier layer serves to prevent the passage of fluids being conveyed in the flexible pipe body from the interior to the exterior, that is from the bore into the annulus. Suitable polymeric materials for forming the barrier layer are well known in the art and examples include PVDF (polyvinylidene fluoride) and other fluoropolymers, polyamide 11, polyamide 12, polyolefins such as polyethylene, crosslinked polyethylene (PEX), and polyphenylene sulphide (PPS).

As will readily be appreciated from FIG. 1, a typical carcass layer (101 in FIG. 1, 301 in FIG. 3) presents an outer surface which, because of the interlocked construction, is uneven. Such an uneven outer surface of the carcass layer 301 is disadvantageous for the subsequent addition of the barrier layer 302, more especially when the barrier layer is formed by a polymer extrusion process. For example, application of the barrier layer 302 to an uneven surface (of the carcass layer 301) can lead to stress concentrations in the barrier layer and, ultimately, to premature failure of the barrier layer. It is thus desirable to achieve a smooth surface with which the inner surface of the barrier layer is in contact.

Embodiments of the invention provide a wear layer 310 between the carcass layer 301 and the barrier layer 302. The wear layer 310 sits immediately adjacent the outer surface of the carcass layer 301 and serves to present a smooth even outer surface for application of the barrier layer 302.

As noted above, in embodiments of the invention it is advantageous for the wear layer 310 to act as a sacrificial wear layer. That is, the wear layer 310 may be configured so that, for example, after it has served its desired purpose it may be removed from the flexible pipe body. For example, in the manufacture of flexible pipe body 100, 300, sacrificial wear layer 310 may serve the purpose of providing a smooth and even surface for application (e.g. by extrusion) of the barrier layer 302, after which point the sacrificial wear layer 310 may not be necessary or essential to the use of the flexible pipe body 300. The sacrificial wear layer 310 may thus usefully be removed from the pipe body 100, 300.

Advantageous embodiments of the invention provide that the material of which the wear layer 310 is comprised is soluble or dispersible by contact with solvent medium, in particular an aqueous medium. Thus, the sacrificial wear layer 310 may be removed by contacting it with a suitable solvent medium, in particular an aqueous medium.

In some preferred embodiments the aqueous medium is water. In some preferred embodiments, the material of which the wear layer is comprised is soluble, in particular readily soluble, in water. Examples include Brenntag's "Klucel" or "Klucel HPC", and Monosol's film products. Such materials may also be suitable for sacrificial layers which are not wear layers, discussed further below.

In some embodiments of the invention, the material of which the sacrificial wear layer 310 is comprised is selected to be soluble or dispersible in during a Factory Acceptance Testing (FAT) procedure. FAT procedures typically use water as the pressurising medium, but other fluids are not excluded where suitable for FAT use. Advantageously, the said material of the sacrificial wear layer is soluble in an aqueous pressurising medium, especially water, during a FAT procedure.

Since the sacrificial wear layer 310 has served a desired purpose of providing a smooth surface for extrusion of a barrier layer 302, which extrusion step occurs prior to FAT, removal of the wear layer 310 during the FAT procedure (that is, before the flexible pipe body 300 is put to its intended use) is advantageous.

In other embodiments of the invention, the sacrificial wear layer 310 may be removed (by dissolution or dispersion in a solvent medium, preferably an aqueous medium, in particular water) in a procedure other than a FAT procedure.

In embodiments of the invention the flexible pipe body may additionally (or alternatively) include one or more outer sacrificial wear layers. The term "outer" in this respect is used to indicate that the outer sacrificial wear layer is located radially outwardly of the internal pressure sheath, within the annulus. One example of such a construction of a flexible pipe body is illustrated in FIG. 4.

Figure 4:
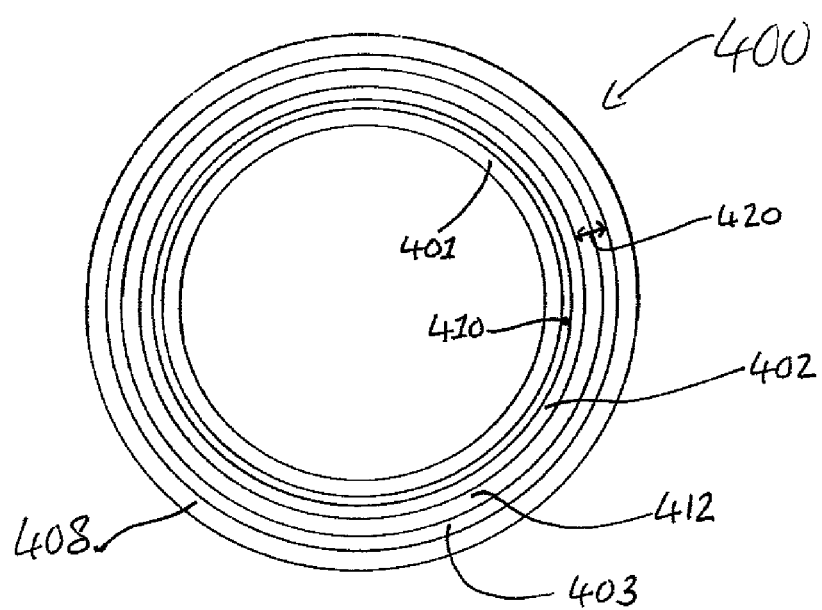
FIG. 4 illustrates a cross section though a flexible pipe body according to another embodiment of the invention.

In FIG. 4, layers and components of the illustrated flexible pipe body having the same or equivalent construction to those of FIG. 1 and FIG. 3 are given the same reference number, except for the use of the prefix "4". By way of example, carcass layer 101 of FIG. 1 or 301 in FIG. 3 is equivalent to carcass layer 401 in FIG. 4. For clarity of illustration, not all the layers shown in FIG. 1 are illustrated in FIG. 4, it being understood that some or all of the non-illustrated layers of FIG. 1 may be present in the embodiment illustrated in FIG. 4, as may other layers not shown in FIG. 1. The presence or absence of particular layers not specifically illustrated in FIG. 4 may be determined by the person skilled in the art and in accordance with the particular intended use requirements of a given flexible pipe body 400 of the invention.

The void space of the pipe as illustrated in FIG. 4, formed between the inner barrier layer 402 and the outer sheath 408, is known as the annulus 420 of the pipe and may contain other layers such as pressure armouring layer(s) 403. Other layers which may, for example, be present in the annulus 420 include tensile armour layers, tape and insulation. These latter layers are not specifically illustrated in FIG. 4 but reference may be made to the corresponding layers of FIG. 1.

For completeness, it is noted that, in embodiments of the invention one or more wear layers may be provided within the annulus 420 which wear layers are not sacrificial wear layers.

Provision of an appropriately located wear layer within the annulus can be advantageous in providing some creep allowance between the barrier layer 402 and the pressure armour layer 403, which can avoid undesirable crazing of the barrier layer 402.

One or more wear layers may be present between or over armouring layers in the flexible pipe body structure. One or more of such wear layers may in embodiments of the invention desirably be a sacrificial wear layer.

As will be discussed in more detail below, sacrificial polymer layers which are not wear layers (i.e. the primary function of which is other than to act as a wear layer) may, in embodiments of the invention, be provided in the annulus. Such sacrificial polymer layers may, in embodiments of the invention, be present in addition to one or more sacrificial wear layers.

With reference to FIG. 4, in embodiments of the invention, the flexible pipe body 400 may be provided with an outer sacrificial wear layer 412 arranged between the barrier layer 402 and a pressure armour layer 403. In these embodiments, the outer sacrificial wear layer 412 may be configured so that, for example, after it has served its desired purpose it may be removed from the flexible pipe body 400. Advantageous embodiments of the invention provide that the material of which the outer sacrificial wear layer 412 is comprised is soluble or dispersible by contact with solvent medium, in particular an aqueous medium. In some preferred embodiments the aqueous medium is water. In some preferred embodiments, the material of which the outer sacrificial wear layer 412 is comprised is soluble, in particular readily soluble, in water.

In embodiments, the material of the, one of, or each, outer sacrificial wear layer may be removed or dispersed by introducing a solvent medium into the annulus of the flexible pipe body or precursor. The solvent medium is ideally selected to be not detrimental to the surface or properties of the layers or components in the annulus with which the solvent medium may come into contact (other than the layer(s) intended for removal). Such solvent medium may, in embodiments, be selected to be a non-aqueous solvent medium. The solvent medium in these embodiments may be selected to be a solvent for the one or more given outer sacrificial wear layers and to be a non-solvent for one or more other outer sacrificial wear layers which may also be present in the annulus.

A procedure analogous to that of the preceding paragraph may, in embodiments, similarly be applied for removal of one or more sacrificial layers in the annulus which are not wear layers, through the appropriate choice of the material of the sacrificial layer and of a solvent for the chosen sacrificial layer.

The sacrificial layer 310 and the outer sacrificial layer 412 may in embodiments of the invention respectively comprise (or consist of) one or more polymeric materials. The choice of polymeric material is made by the skilled person in the light of the particular intended use and associated design constraints of a given flexible pipe body.

As noted above, in embodiments of the invention, a primary function of a sacrificial polymer layer may be as a wear layer which is intended to provide a smooth surface to which the barrier layer 302, 402 may be applied, such as by extrusion. The skilled person may thus choose, based on his knowledge of polymer materials, a soluble or dispersible polymer material which is capable of accommodating the rough uneven nature of the underlying carcass layer and of providing such a smooth outer surface. In such embodiments the sacrificial wear layer preferably comprises an aqueously soluble or dispersible polymer material, most preferably an aqueously soluble polymer material.

In some embodiments of the invention, a sacrificial wear layer itself may be an extruded layer for which the skilled person may choose, based on his knowledge of polymer materials, a soluble or dispersible polymer material which is capable of extrusion. Preferably in these embodiments the soluble or dispersible polymer material is aqueously soluble or dispersible, and most preferably the polymer material is aqueously soluble. For example, the skilled person may consider the melting point of the polymer, the thermal stability of the polymer (with respect to the temperature of the polymer material at the extrusion step) and other factors such as the melt stiffness of the polymer material.

In other embodiments, one or more sacrificial layers may be provided within the annulus of a flexible pipe body for purposes other than acting as a wear layer, such sacrificial layer or layers being of soluble or dispersible material.

In embodiments of the invention, the material of which an outer sacrificial polymer layer is comprised may be selected to be soluble or dispersible in water in the event of a breach in the outer sheath or in the event of condensation of water in the annulus of the pipe body.

In some embodiments, a sacrificial layer disposed within an annulus of a flexible pipe body may be used as a 'carrier' to release a material into the annulus at a certain time or in response to a particular event.

In examples of such embodiments the sacrificial layer may contain a dye, such as a fluorescein dye. In the event of a breach in the flexible pipe body by which sea water enters the annulus of the flexible pipe body, the sacrificial layer is dissolved or dispersed by the sea water resulting in release of the dye into the surrounding area. Release of the dye provides an indication of the location of the breach in the flexible pipe. Thus in these embodiments, the sacrificial layer acts as a carrier of a dye material within its structure, and the sacrificial layer is present in a flexible pipe body during normal use. The dye may, in particular embodiments, be evenly dispersed throughout the sacrificial layer, or may be provided in discrete pockets or cells in the sacrificial layer.

In other further embodiments the sacrificial layer may act as a carrier for a material capable of sealing—at least temporarily—a hole in a flexible pipe body in the event of a breach in the flexible pipe body. Such breach may be an external breach which permits the ingress of water the annulus of the flexible pipe body or may be an internal breach, in the barrier or liner, allowing ingress of, for example, production fluid from the bore into the annulus of the flexible pipe body.

Where the sacrificial layer is intended to provide a repair in the event of an external breach, the sacrificial layer preferably comprises a polymer material which is aqueously soluble or aqueously dispersible and which serves as a carrier for a repair material which repairs the breach. For example, the repair material may be a monomer or pre-polymer which undergoes a volume expanding polymerisation (such as the generation of a foam) on contact with sea water, thereby to fill the breach with a water-impermeable plug. For example, the expansive polymerisation may result in a rapidly expanded foam material. Suitable examples include polyurethane materials or precursor materials of polyurethane materials which react to generate the polyurethane when exposed to sea water.

In the case of an internal breach, the sacrificial layer is selected to be soluble or dispersible in the relevant production fluid which the flexible pipe conveys and the repair material becomes effective on dissolution or dispersion of the sacrificial layer. For example, the repair material may be a monomer or pre-polymer which undergoes an expansive polymerisation on contact with production fluid, thereby to fill the breach with an impermeable plug.

In another embodiment, a sacrificial layer disposed within the annulus of the flexible pipe body wear layer may act as a carrier for a chemical material which is intended to mitigate adverse effects of chemical moieties which may penetrate the annulus from the pipe bore, as the result of a breach, or by permeation through a barrier layer or liner. For example, production fluids may commonly include acidic species which, if left to build up in the annulus may have harmful (e.g. corrosive) effects on components within the annulus. A particular example of an acidic species is $H_2S$ which, even at a low rate of permeation, may eventually result in a damaging build up in the annulus. Thus the sacrificial layer may act as a carrier layer for an agent which, on contact with an acidic species such as $H_2S$, reacts therewith to neutralise the acidic species. For example, the said agent may be a weak base. In alternative embodiments, the sacrificial layer itself may be capable of reacting to neutralise an undesired (e.g. acidic) species present in the annulus. Further details of materials suitable for neutralising acidic species in a flexible pipe body annulus can be seen in co-pending application PCT/GB2012/053115.

In further embodiments the sacrificial layer may include one or more filler materials or enhancers. Examples include corrosion inhibitors, particular examples of these being polymers of dicarboxylic acids, and in particular of itaconic acid.

In related embodiments, the sacrificial layer may be provided within the layer with discrete areas or pockets of chemicals which are released when the sacrificial layer is in contact with an aqueous medium. The chemicals may be encapsulated in the sacrificial layer and the encapsulating material may be selected to be aqueously soluble such that dissolution of the encapsulating material permits release of the chemical. The chemical may be selected to neutralise acidic species within the annulus, or to act as a corrosion inhibitor, by way of example. Suitable chemical moieties for use as corrosion inhibitors include (without limitation) amines and their derivatives, bisulphites (e.g. ammonium bisulphite), organic ester salts, or mixtures thereof.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A flexible pipe body, or a precursor for a flexible pipe body, comprising an inner fluid retaining layer defining a pipe bore for the transmission of fluids, at least one reinforcement layer configured to resist internal or external pressure and/or tensile loads in the pipe body or precursor, and at least one sacrificial layer, wherein the sacrificial layer is soluble or dispersible on contact with a solvent medium.

2. A flexible pipe body or a precursor as claimed in claim 1 wherein said inner fluid retaining layer is a barrier layer, wherein said at least one reinforcement layer includes a carcass layer arranged within the barrier layer, and wherein an inner sacrificial layer is arranged between the carcass layer and the barrier layer.

3. A flexible pipe body or a precursor as claimed in claim 2 wherein said inner sacrificial layer is a coating on the carcass layer.

4. A flexible pipe body or a precursor as claimed in 2 wherein said inner sacrificial layer is an extruded layer.

5. A flexible pipe body or a precursor as claimed in claim 4 wherein the inner sacrificial layer is co-extruded with the barrier layer.

6. A flexible pipe body or a precursor as claimed in claim 2 wherein the inner sacrificial layer comprises a tape wound around the carcass layer.

7. A flexible pipe body or a precursor as claimed in claim 1 comprising an outer sheath layer and defining an annulus region between said outer sheath layer and the inner fluid retaining layer, the annulus region including at least one outer sacrificial layer and at least one reinforcement layer.

8. A flexible pipe body or a precursor as claimed in claim 7 wherein the at least one reinforcement layer comprises or includes a pressure armour layer.

9. A flexible pipe body or a precursor as claimed in claim 8 wherein a said outer sacrificial layer is provided in contact with said pressure armour layer.

10. A flexible pipe body or a precursor as claimed in claim 7 wherein the at least one reinforcement layer comprises or includes at least one tensile armour layer.

11. A flexible pipe body or a precursor as claimed in claim 10 wherein a said outer sacrificial layer is provided in contact with a said tensile armour layer.

12. A flexible pipe body or a precursor as claimed in claim 7 wherein said outer sacrificial layer is a coating on the inner fluid retaining layer.

13. A flexible pipe body or a precursor as claimed in claim 7 wherein said outer sacrificial layer is an extruded layer.

14. A flexible pipe body or a precursor as claimed in claim 7 wherein said outer sacrificial layer is co-extruded with the inner fluid retaining layer.

15. A flexible pipe body or a precursor as claimed in claim 7 wherein said outer sacrificial layer comprises a tape wound respectively around one or more of:
    (i) the inner fluid retaining layer
    (ii) a pressure armour layer,
    (iii) a tension armour layer, or
    (iv) another layer the flexible pipe body or precursor disposed outwardly of the inner fluid retaining layer and inwardly of the outer sheath.

16. A flexible pipe body or a precursor as claimed in claim 1 wherein said sacrificial layer is soluble or dispersible in an aqueous solvent medium.

17. A flexible pipe body or a precursor as claimed in claim 16 wherein said sacrificial layer is soluble or dispersible in water.

18. A flexible pipe body or a precursor as claimed in claim 1 wherein the or each sacrificial layer comprises or consists of a material independently selected from
    one or more soluble or dispersible synthetic polymeric materials, and/or
    one or more soluble or dispersible natural, or natural-derived, oligomeric or polymeric materials,
    or mixtures or combinations thereof.

19. A flexible pipe body or a precursor as claimed in claim 18 wherein said material is aqueously soluble or dispersible.

20. A flexible pipe body or a precursor as claimed in claim 18 wherein the natural or natural-derived polymer is selected from one or more soluble or dispersible polysaccharides, gelatin based materials, and casein derivatives.

21. A flexible pipe body or a precursor as claimed in claim 20 wherein the one or more soluble or dispersible polysaccharides is selected from carrageenan, guar gum, xanthan gum, pectins, dextran, starches, alginates, glucose based materials, sucrose based materials or derivatives thereof.

22. A flexible pipe body or a precursor as claimed in claim 20 wherein the one or more soluble or dispersible polysaccharides is selected from one or more cellulose ethers such as hydroxypropylmethyl cellulose, hydroxypropyl cellulose, hydroxyethyl cellulose and carboxymethyl cellulose.

23. A flexible pipe body or a precursor as claimed in claim 18 wherein the one or more soluble or dispersible synthetic polymeric materials is selected from polyvinylacetate (PVA), polyethylene glycols, polyvinylpyrrolidones, polyamines, polyethyleneamines, polyacrylic acids, polyvinyl alcohols, polyacrylamides, polyphosphoesters and polyphosphazenes or combinations thereof.

24. A flexible pipe body or a precursor as claimed in claim 7 wherein the outer sacrificial layer comprises a functional material which is released or activated on contact of the outer sacrificial layer with said solvent medium.

25. A flexible pipe body or a precursor as claimed in claim 24 wherein the functional material is a dye which is soluble or dispersible in the solvent medium.

26. A flexible pipe body or a precursor as claimed in claim 24 wherein the functional material is a sealant which acts to seal a breach in the outer sheath layer on penetration of solvent medium through the outer sheath layer.

27. A flexible pipe body or a precursor as claimed in claim 24 wherein the functional material is a sealant which acts to seal a breach in the inner sheath layer on penetration of solvent medium through the inner sheath layer.

28. A flexible pipe body or a precursor as claimed in claim 24 wherein the functional material acts on contact with solvent medium to neutralise or render harmless potentially harmful or damaging materials contained in, or which are components of, the solvent medium.

29. A flexible pipe body or a precursor as claimed in claim 24 wherein the functional material acts to neutralise or render harmless potentially harmful or damaging materials which permeate into the annulus region.

30. A method of preparing flexible pipe body, or a precursor for a flexible pipe body, the method comprising:
providing at least one reinforcement layer, configured to resist internal or external pressure and/or tensile loads in the pipe body or precursor layer,
providing an inner fluid retaining layer configured to define a pipe bore for the transmission of fluids,
providing at least one sacrificial layer, wherein the sacrificial layer is soluble or dispersible on contact with a solvent medium, and
dissolving or dispersing at least part of the sacrificial layer in a solvent medium.

31. A method as claimed in claim 30 wherein the soluble or dispersible material is an aqueously soluble or aqueously dispersible material.

32. A method as claimed in claim 30 wherein the solvent medium is an aqueous solvent, and preferably wherein the solvent medium is water.

33. A method as claimed in claim 30 wherein the soluble or dispersible material comprises a material or combination of materials independently selected from
one or more soluble or dispersible synthetic polymeric materials, and/or
one or more soluble or dispersible natural, or natural-derived, oligomeric or polymeric materials,
or mixtures or combinations thereof.

34. A method as claimed in claim 30 wherein said inner fluid retaining layer is a barrier layer, the method comprising providing a reinforcement layer comprising a carcass layer arranged within the barrier layer, providing an inner sacrificial layer arranged between the carcass layer and the barrier layer and removing at least part, and preferably substantially all, of the inner sacrificial layer by contact with the solvent medium.

35. A method as claimed in claim 34 wherein the step of removing the inner sacrificial layer comprises contacting the inner sacrificial layer with an aqueous medium, preferably water, during a Factory Acceptance Testing (FAT) procedure.

36. A method as claimed in claim 30 further comprising:
providing an outer sheath layer thereby to define an annulus region between said outer sheath layer and the inner fluid retaining layer,
providing at least one outer sacrificial layer arranged in said annulus region, and
removing at least part, and preferably substantially all, of the outer sacrificial layer by contact with the solvent medium when said solvent medium is present in the annulus region.

37. A method as claimed in claim 36 wherein the step of removing said outer sacrificial layer comprises deliberately or intentionally introducing said solvent medium to the annulus region.

38. A method as claimed in claim 36 wherein the solvent medium is present in the annulus region as a result of penetration or transmission of the solvent medium through the outer sheath layer or the inner fluid retaining layer.

* * * * *